(12) United States Patent
Sciorelli

(10) Patent No.: US 7,895,823 B2
(45) Date of Patent: Mar. 1, 2011

(54) HEAT EXCHANGER FOR A ROCKET ENGINE

(75) Inventor: Frank A. Sciorelli, Cameron Park, CA (US)

(73) Assignee: Aerojet-General Corporation, Redmond, WA (US)

( * ) Notice: Subject to any disclaimer, the term of this patent is extended or adjusted under 35 U.S.C. 154(b) by 344 days.

(21) Appl. No.: 12/147,396

(22) Filed: Jun. 26, 2008

(65) Prior Publication Data
US 2009/0218086 A1    Sep. 3, 2009

Related U.S. Application Data

(60) Provisional application No. 60/946,364, filed on Jun. 26, 2007, provisional application No. 60/946,682, filed on Jun. 27, 2007.

(51) Int. Cl.
*F02K 99/00*    (2009.01)
(52) U.S. Cl. .......................................... 60/266; 60/267
(58) Field of Classification Search .................. 60/257, 60/260, 266, 267; 239/127.1, 127.3; 165/157, 165/164, 165, 181
See application file for complete search history.

(56) References Cited
U.S. PATENT DOCUMENTS 2,424,795 A * 7/1947 Burns .......................... 165/103
3,721,093 A * 3/1973 Wolf et al. ..................... 60/267
5,609,034 A * 3/1997 Mita et al. ........................ 62/6
5,765,360 A * 6/1998 Schmidt et al. ............... 60/204
2006/0124284 A1* 6/2006 Ushio et al. .................. 165/157

OTHER PUBLICATIONS

"Final Report, Development History of the 200,000- and 225,000- Pound-Thrust J-2 Rocket Engines," Rocketdyne Engineering, Contract NAS8-19, Exhibit D, Paragraph B.2.b of Modification 126, Canoga Park, California, Dec. 13, 1996.
"J-2 Data Package," Rocketdyne Engineering, pp. 1-114, publication date unknown.

* cited by examiner

*Primary Examiner*—Michael Cuff
*Assistant Examiner*—Phutthiwat Wongwian
(74) *Attorney, Agent, or Firm*—Christensen O'Connor Johnson Kindness PLLC

(57) ABSTRACT

A cylindrical rocket engine exhaust duct has a liner that fits inside an outer jacket. The outer periphery of the liner has circumferentially spaced ribs defining a sinuous path for a fluid to be heated. The liner has a least one, preferably several, transverse fins with internal serpentine passages for carrying the fluid to be heated through the fins. The fluid to be heated is directed around the periphery of the liner (between the liner and the jacket), and consecutively through the separate fins, along sinuous and serpentine paths for heating of the fluid by heat transfer from the exhaust gas of the rocket engine.

6 Claims, 12 Drawing Sheets

HEAT EXCHANGER FOR A ROCKET ENGINE

CROSS-REFERENCE TO RELATED APPLICATIONS

This application claims the benefit of Provisional Application No. 60/946,364, filed Jun. 26, 2007, and Provisional Application No. 60/946,682, filed Jun. 27, 2007.

BACKGROUND

The invention pertains to a heat exchanger that extracts heat from an exhaust duct of a rocket engine to heat another fluid, particularly a propellant such as liquid oxygen (LOX).

For example, the well-known J-2 is a pump-fed liquid rocket engine having a heat exchanger in the turbine drive gas circuit for heating liquid oxygen. The heated oxygen is used in autogenous pressurization of the vehicle liquid oxygen tank. This engine is described in various publications including the "FINAL REPORT, DEVELOPMENT HISTORY OF THE 200,000- AND 225,000-POUND-THRUST J-2 ROCKET ENGINES" prepared by Rocketdyne Engineering of Canoga Park, Calif., in accordance with contract NAS8-19, Exhibit D, paragraph B.2.b of Modification 12b, dated 13 Dec. 1966, which is expressly incorporated by reference herein. Heat exchangers for oxidizer tank pressurization are described at pages 403-407 of the report. Also submitted in the Information Disclosure Statement filed herewith and expressly incorporated by reference herein are drawings from the J-2 Data Package published by Rocketdyne, sheets 1-114. The schematic of the exhaust system (sheet 94 of the data package) and the heat exchanger (sheet 100) are incorporated in the drawings of this application.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides an improved heat exchanger in the exhaust system of a rocket engine, particularly for heating fluid propellant such as liquid oxygen. In one embodiment, a cylindrical exhaust duct has a liner or core that fits inside an outer shell or jacket. The outer periphery of the core has circumferentially spaced ribs defining a sinuous path for a fluid to be heated, such fluid being introduced at one side from the exterior of the shell. The core has at least one, preferably several, transverse fins with internal passages for carrying the fluid to be heated through the fins. Preferably the passages in each fin form one or more serpentine paths for such fluid, and the path or paths communicate with the sinuous passages between the liner and jacket of the exhaust conduit, heat exchanger assembly. More specifically, in one embodiment the fluid to be heated is conveyed along a sinuous path between the outer jacket and core, then through a serpentine path in one of the fins, then through another path between the liner and jacket to the next fin, and so on, until the heated fluid reaches an outlet at the opposite side of the heat exchanger. Heat from the exhaust stream flowing through the conduit, between the fins, is effectively transferred to the fluid, without undue obstruction of the exhaust conduit.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
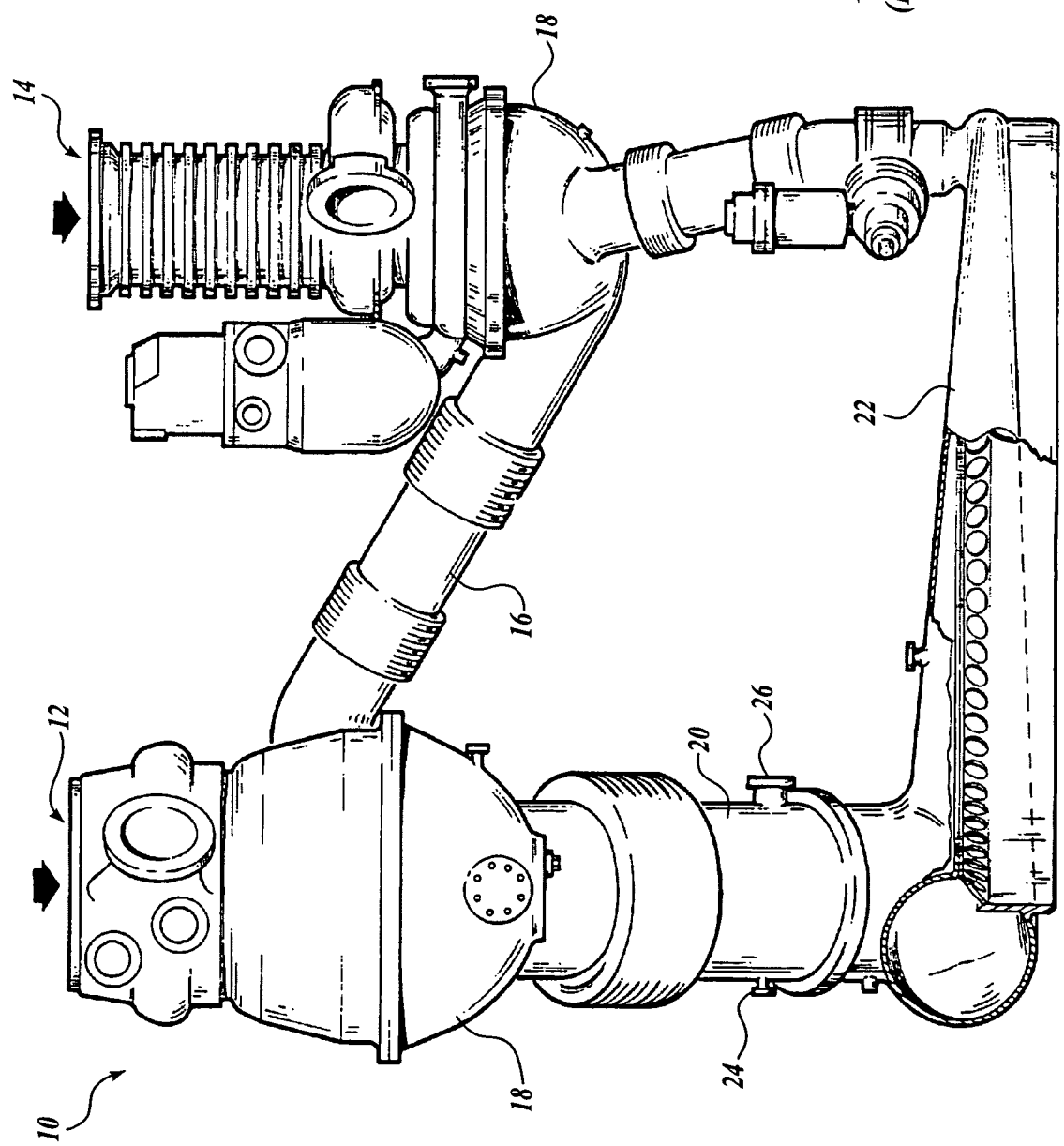
FIG. 1 (Prior Art) is a schematic illustration of the exhaust system of a J-2 rocket engine.

FIG. 1 (prior art) shows components of the exhaust system 10 of a J-2 rocket engine. Oxydizer enters at 12 and fuel at 14. A cross over duct 16 connects the corresponding turbo pumps 18. Exhaust flows through a duct 20 and exhaust manifold 22. A heat exchanger is provided in exhaust duct 20. In the system illustrated, the heat exchanger has a liquid oxygen (LOX) inlet 24 and outlet 26.

Figure 2:
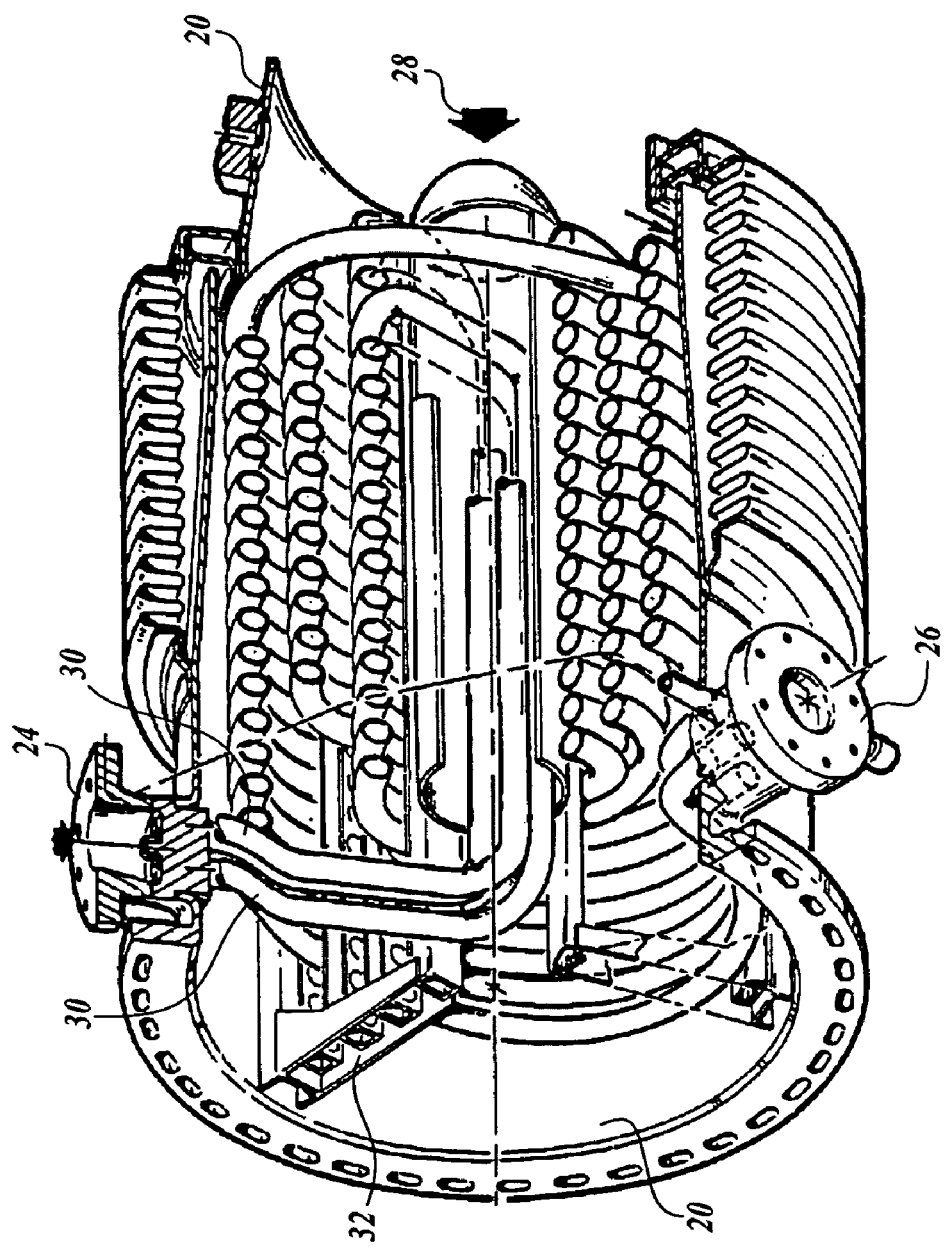
FIG. 2 is an enlarged schematic illustration of the heat exchanger component of such exhaust system with parts broken away.

The heat exchanger is shown in greater detail in FIG. 2 (prior art). The hot gas inlet is indicted by arrow 28 at the right, which corresponds to the top of the exhaust duct 20 in the orientation shown in FIG. 1. The liquid oxygen inlet 24 connects to one or more tubes 30 which are coiled in the exhaust duct and which eventually lead to the outlet 26.

In a representative installation, the tube bundle has complex tube bending paths with many weld or braze joints. The bundle of tubing may be somewhat flexible. Additional supports or brackets 32 are used to mount the bundle securely in the turbine gas flow stream. Safety and reliability are particularly critical for this type of component because a liquid oxygen leak into the fuel rich gas stream could lead to catastrophic failure of the engine, as has occurred in rocket engine ground tests. The stainless tubing itself has a low resistance to ignition in an oxygen environment and will sustain combustion once ignited. The thin-walled tubing is subject to damage from foreign objects or handling that may lead to failure; or failure may occur because of the rocket engine's severe vibration environment; or any braze or weld joints in the hot gas stream may leak leading to a failure.

Figure 3:
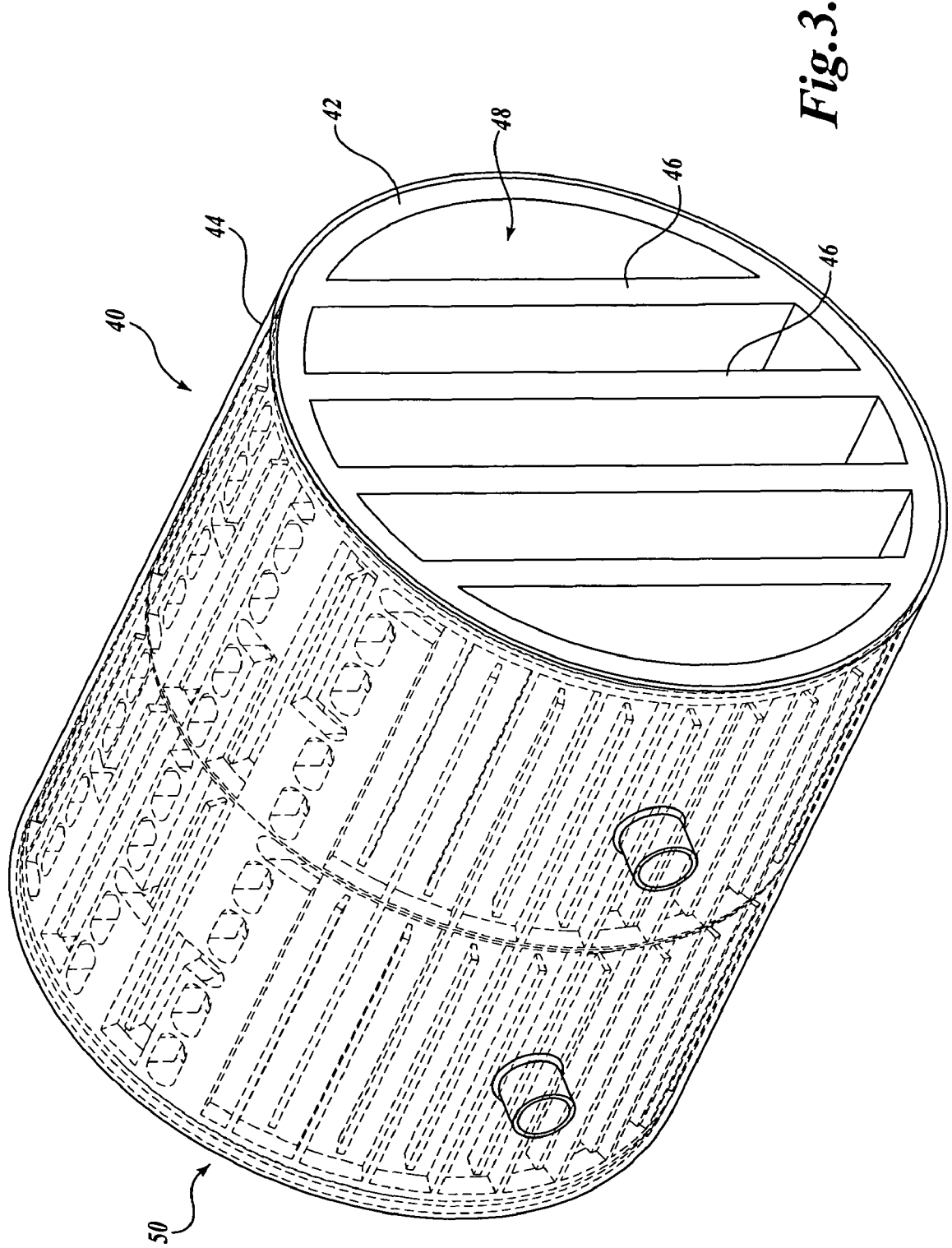
FIG. 3 is a perspective of a rocket engine heat exchanger in accordance with the present invention, with parts assembled.
Figure 4:
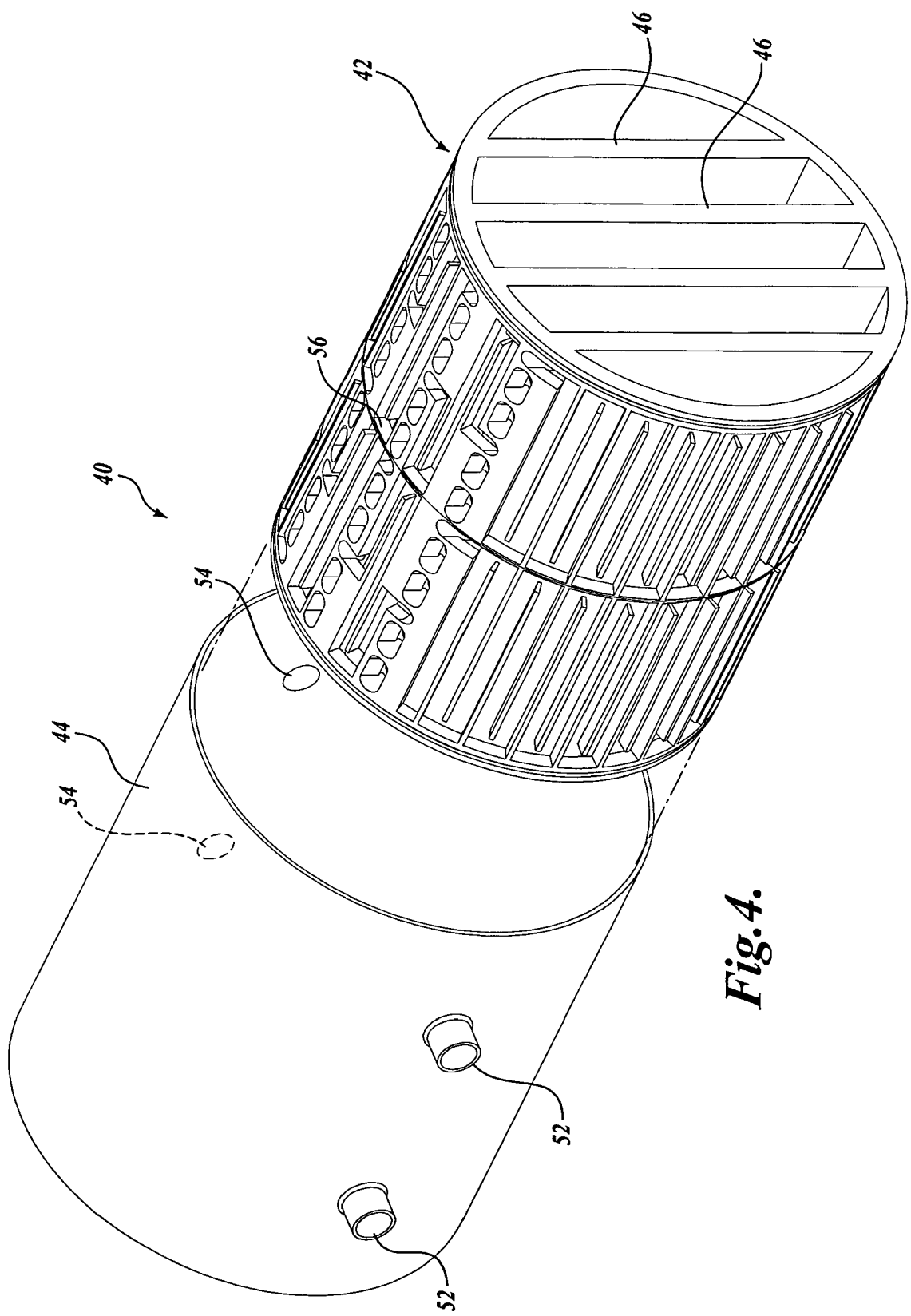
FIG. 4 is a corresponding perspective of such heat exchanger with parts shown in exploded relationship.

The present invention provides an improved heat exchanger, particularly for liquid propellant applications, such as liquid oxygen. FIG. 3 shows the two primary components of the heat exchanger 40 assembled, and FIG. 4 shows the two parts in exploded relationship. The liner or core 42 fits inside an outer shell or jacket 44. The liner 42 is a monolithic copper alloy (or other high heat transfer, high temperature resistant material) with one or more heat transfer fins 46 that extend across the exhaust gas-conveying duct portion of the liner or core.

The fins 46 are flat and straight and extend in an axial direction. Preferably they are spaced apart approximately equal distances with their adjacent flat surfaces parallel. In the illustrated embodiment, hot exhaust gas passes substantially unimpeded between the fins 46 from an inlet end 48 to the outlet end 50. As described in more detail below, the fins 46 have internal passages that direct the liquid oxygen or other fluid to be heated through the fins. Each fin can include one or more serpentine paths for the fluid conveyed therethrough. This increases the heat transfer surface area within the fins. The unitary core is machined in one piece which helps to assure that no leaks of oxygen into the fuel rich interior will occur. Additionally, while the heat transfer surface area is large, obstruction to gas flow through the exchanger is small resulting in a low pressure drop.

The jacket 44 fits closely over the liner 46 and preferably is a nickel-based alloy, such as Monel. The cylindrical jacket can be brazed onto the liner by a rotational vacuum compression braze process to produce a highly reliable braze joint between the liner and jacket. The periphery of the liner is formed with grooved and ribbed vent circuits or paths that direct the oxygen around the exterior of the liner, in addition to the oxygen being directed through the interior serpentine paths of the fins 46.

The two-piece heat exchanger design is believed to offer cost and safety benefits over the known, bundled stainless steal tube heat exchanger. Cost is reduced because of the low part count and the simplicity of the design, much of which is adapted for automatic machine production. When manufactured from a single billet, there are no joints to be produced, and reliable computer controlled machine tools can be used with a limited number of manufacturing operation set-ups. The brazed joint between liner 42 and jacket 44 can be produced in one operation using the rotational vacuum compression brazed process (external argon pressure on the liner and jacket and internal vacuum between the liner and jacket during brazing). The combination of pressure and vacuum forces the two parts together at the braze joint interface, and rotation during brazing insures uniform, low variability part temperatures. The combination of design simplicity and robust manufacturing process results in a low production cost and low variability/low defect heat exchanger assembly.

With respect to safety, the copper alloy and Monel alloy are some of the materials most resistant to ignition in an oxygen environment and will not sustain combustion once ignited. The copper alloy liner has thicker walls than the thin-walled stainless steal tube bundles now known, and is more ductile than stainless steal. This allows the liner to be more resistant to damage from handling or from foreign objects. The monolithic brazed structure of the two piece heat exchanger is also less likely to fail from fatigue. The structural pressure vessel brazed joints are isolated from the turbine drive gas by the vent circuits, so if leakage of the oxygen occurs, it will not form a combustible mixture with the fuel rich turbine gas passing through the liner.

Figure 5:
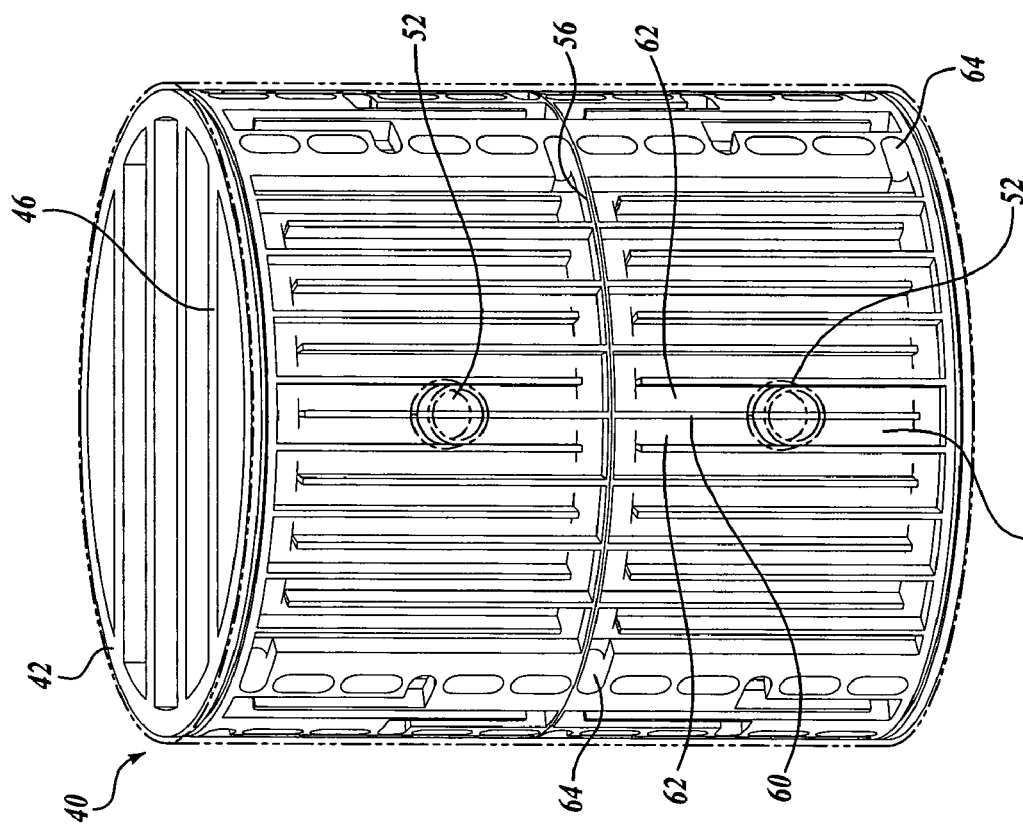
FIG. 5 is a front perspective of a heat exchanger in accordance with the present invention.
Figure 6:
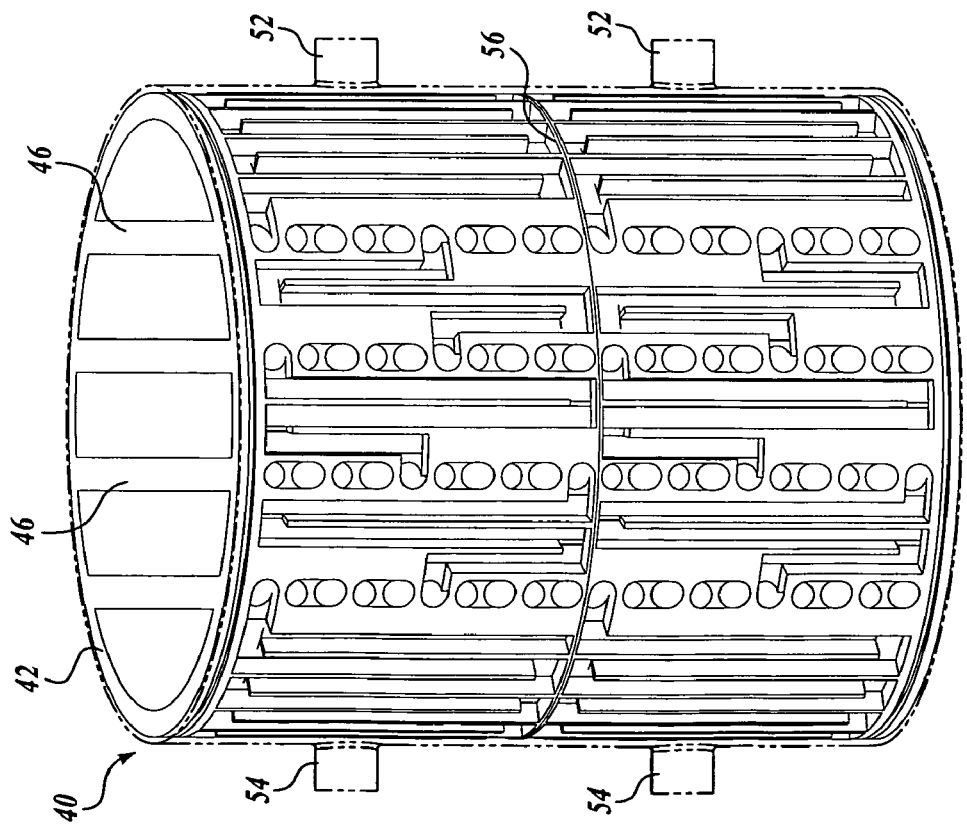
FIG. 6 is a left side perspective thereof.
Figure 7:
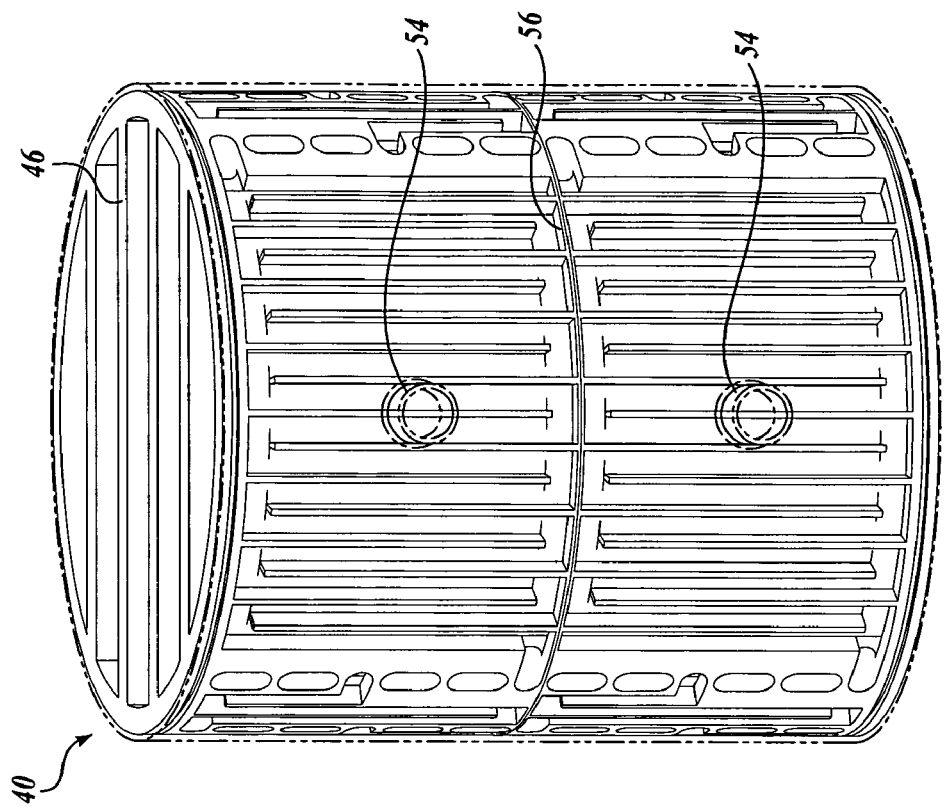
FIG. 7 is a back perspective thereof.
Figure 8:
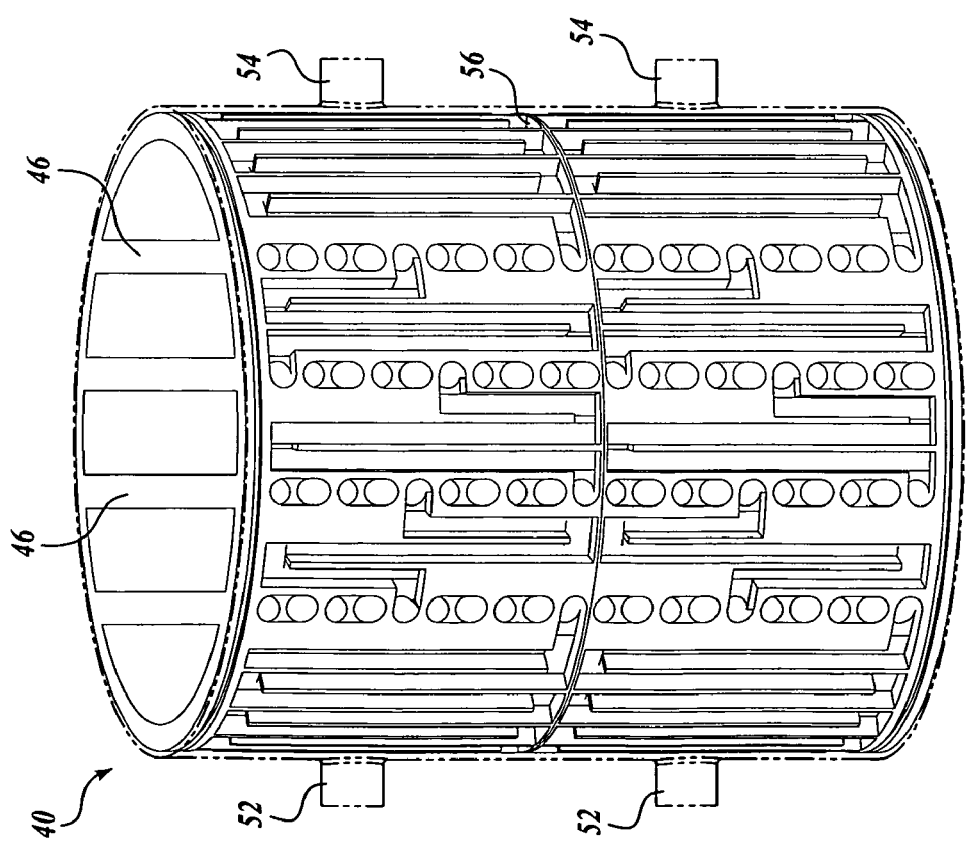
FIG. 8 is a right side perspective thereof.

In FIGS. 5-8, the liner 42 is shown in solid lines and the jacket is shown diagrammatically in broken lines. Each of FIGS. 6, 7, and 8 is rotated 90° from the position shown in the preceding view. Liquid oxygen inlets 52 are provided at one side of the jacket, and outlets 54 at the other. The inlet 52 and outlet 52 at the bottom work with the bottom half of the heat exchanger which is separated from an identical top half by a central, circumferential wall or rib 56.

The internal passages of the fins 46, and the external vent circuits or paths are constructed to cause the oxygen or other fluid to be heated to flow along one of a plurality of convoluted paths from an inlet 52, along the exterior of the liner 42 (between the liner and jacket), and through each of the fins 46, finally to a corresponding outlet 54. In the illustrated embodiment, four such paths are provided, two in the top half of the heat exchanger and two in the bottom half of the heat exchanger. From the bottom inlet 52, one path proceeds counterclockwise along the exterior of the liner, through the bottom half of each of the fins 46, then continues counterclockwise along the exterior of the bottom half to the bottom outlet 54. A second path proceeds clockwise from the same low inlet 52, through the top one-half of each fin 46, to the same low outlet 54. The paths at the top are identical, i.e., one moving clockwise from the top inlet 52 and one moving counterclockwise, each ending at the top outlet 54, but one uses passages in the bottom part of each fin and one uses passages in the top parts.

Referring to FIG. 5 (front view), each inlet 52 is centered over an outward projecting rib 60. Additional ribs extending in the axial direction form a series of channels 62. Referring to the bottom inlet 52, the fluid (liquid oxygen) introduced is directed upward around the top ends of the ribs at either side of the central rib 60 for flow downward along the adjacent channels, then upward along the next remote channels, and so on. The sinuous path at each side ends at an inlet 64 which opens into a passage through the closest fin 46. The passage through the fin is itself serpentine; and the oxygen is then directed consecutively along the liner and through the other fins 46, and finally to its outlet 54.

Figure 9:
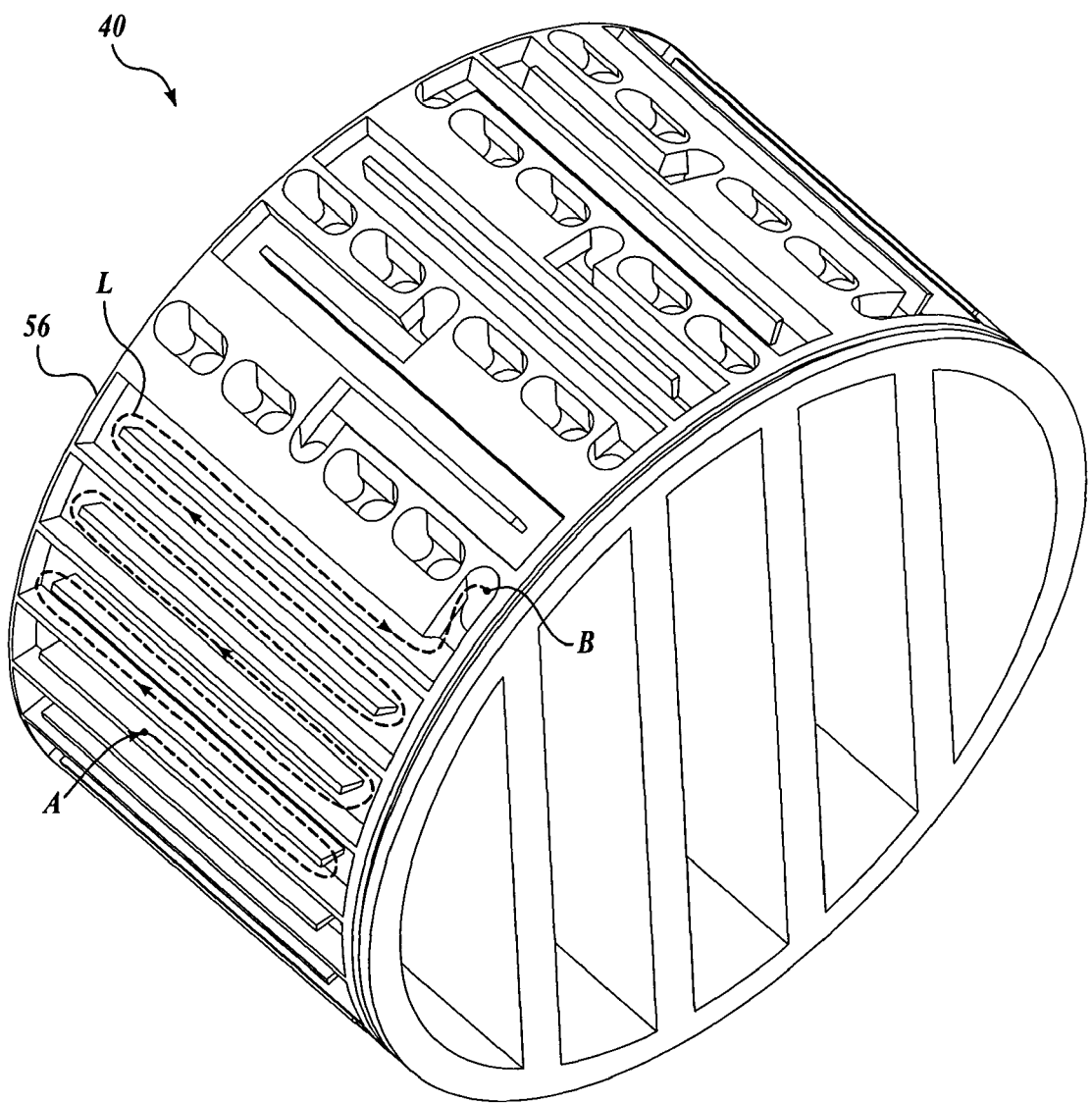
FIG. 9 is diagrammatic perspective of one half-section of an inner core of a heat exchanger in accordance with the present invention illustrating part of the fluid path formed in core.
Figure 9A:
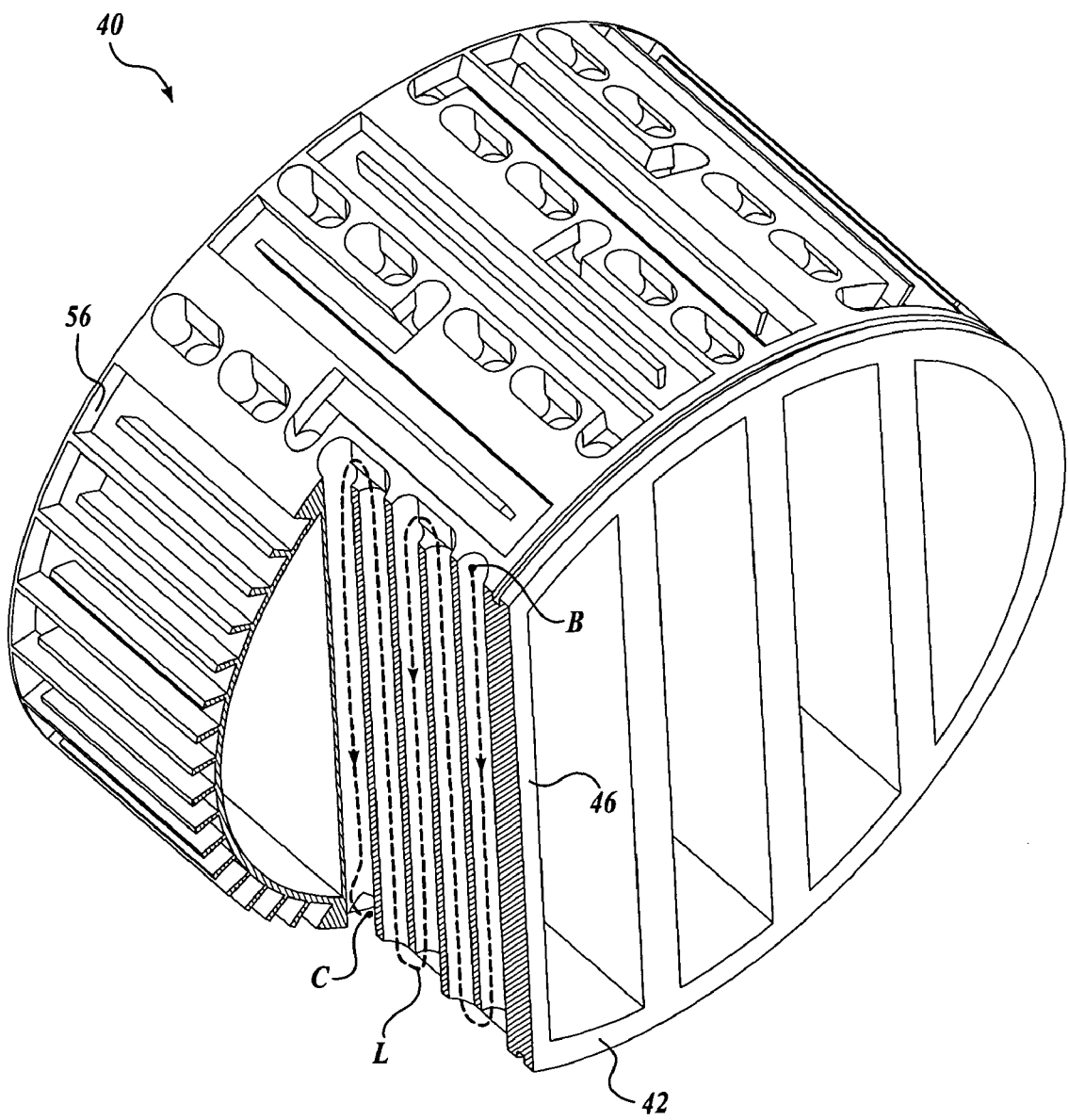
FIG. 9A is corresponding perspective with parts broken away showing a continuation of the fluid path through a first fin.
Figure 9B:
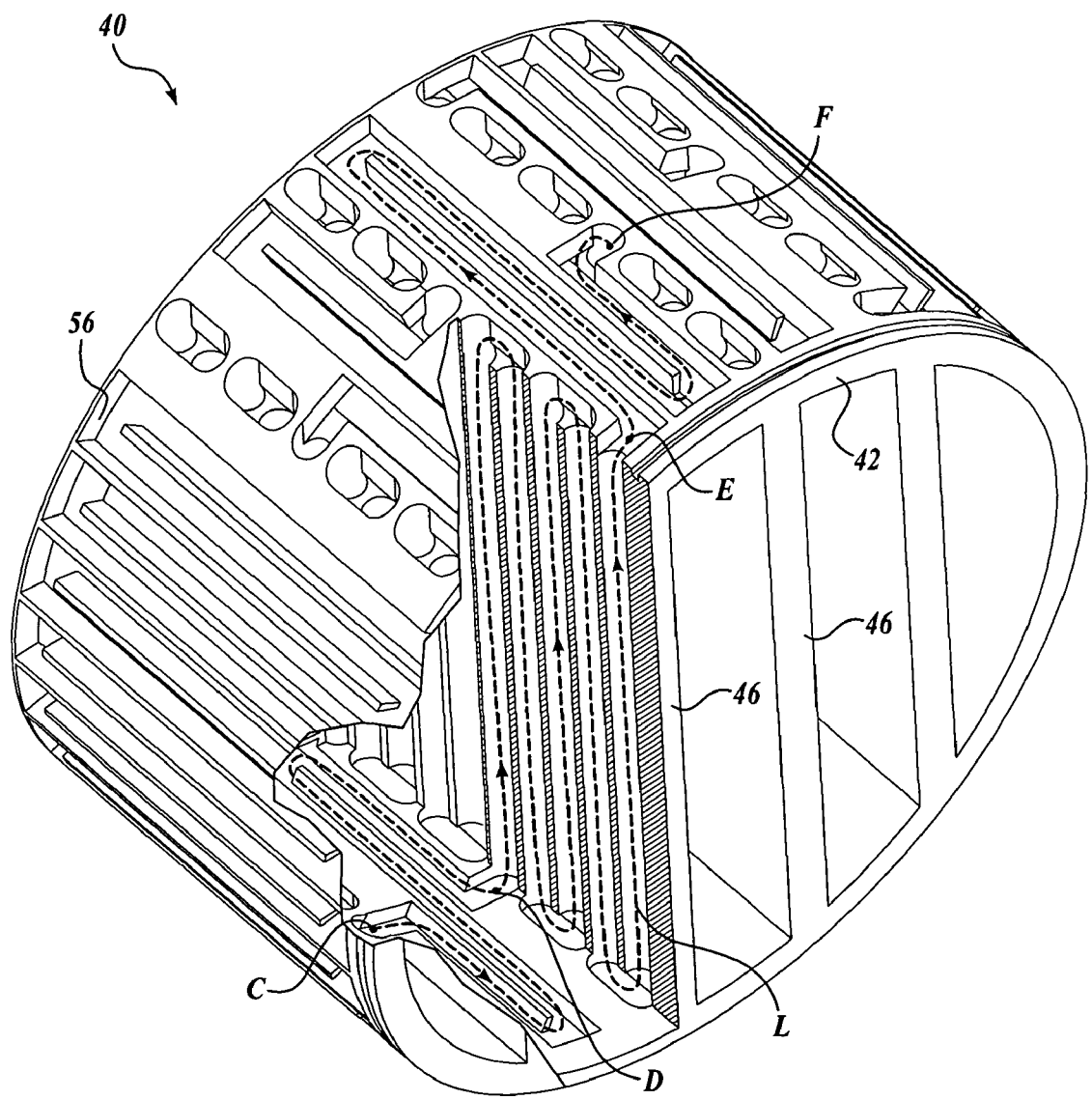
FIG. 9B is a corresponding perspective showing a continuation of the path along the core and through a second fin.
Figure 9C:
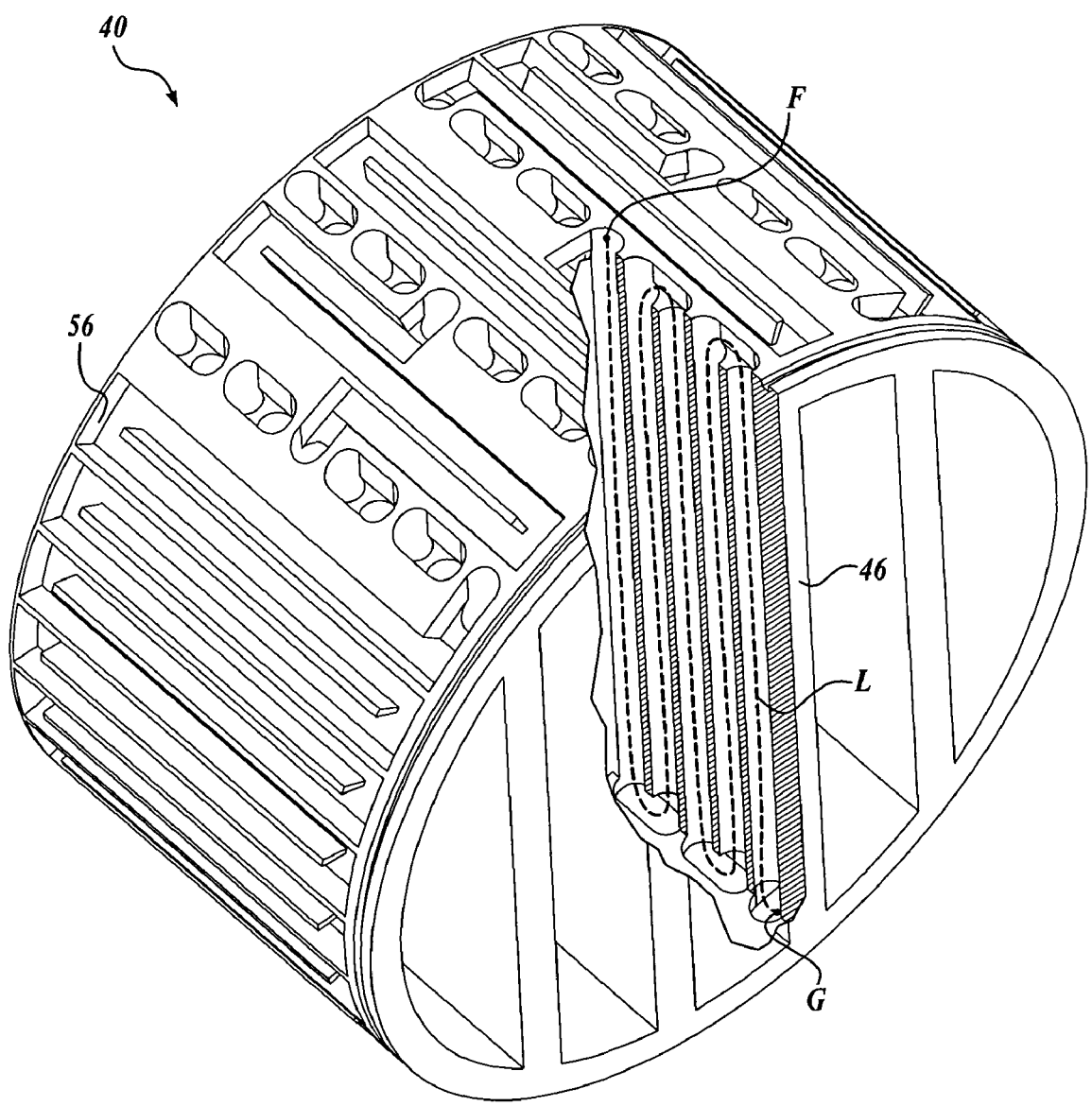
FIG. 9C is a corresponding perspective with parts broken away illustrating a continuation of the path through a third fin.
Figure 9D:
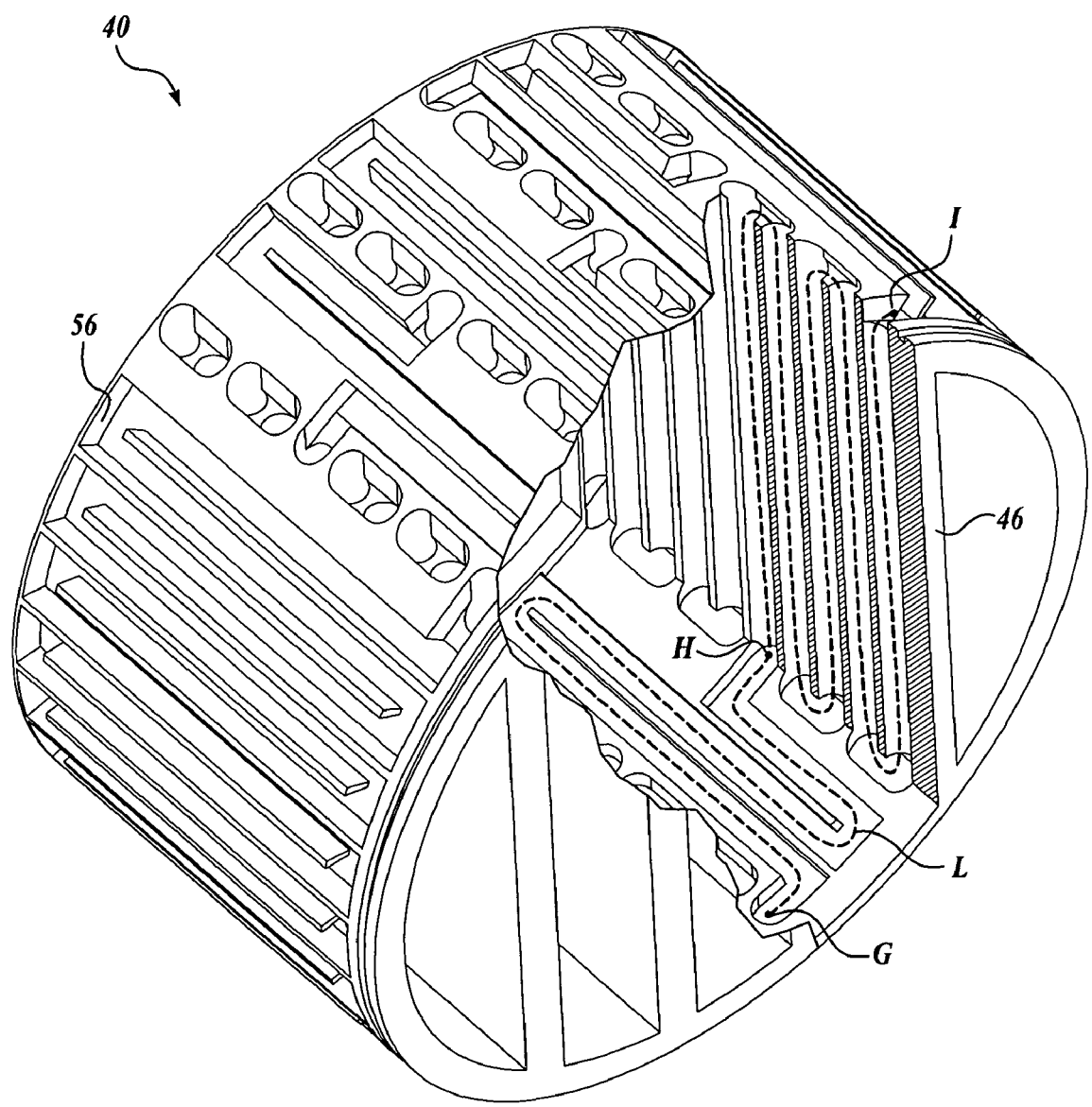
FIG. 9D is a corresponding perspective with parts broken away showing a continuation of the path along the core and through a fourth fin.
Figure 9E:
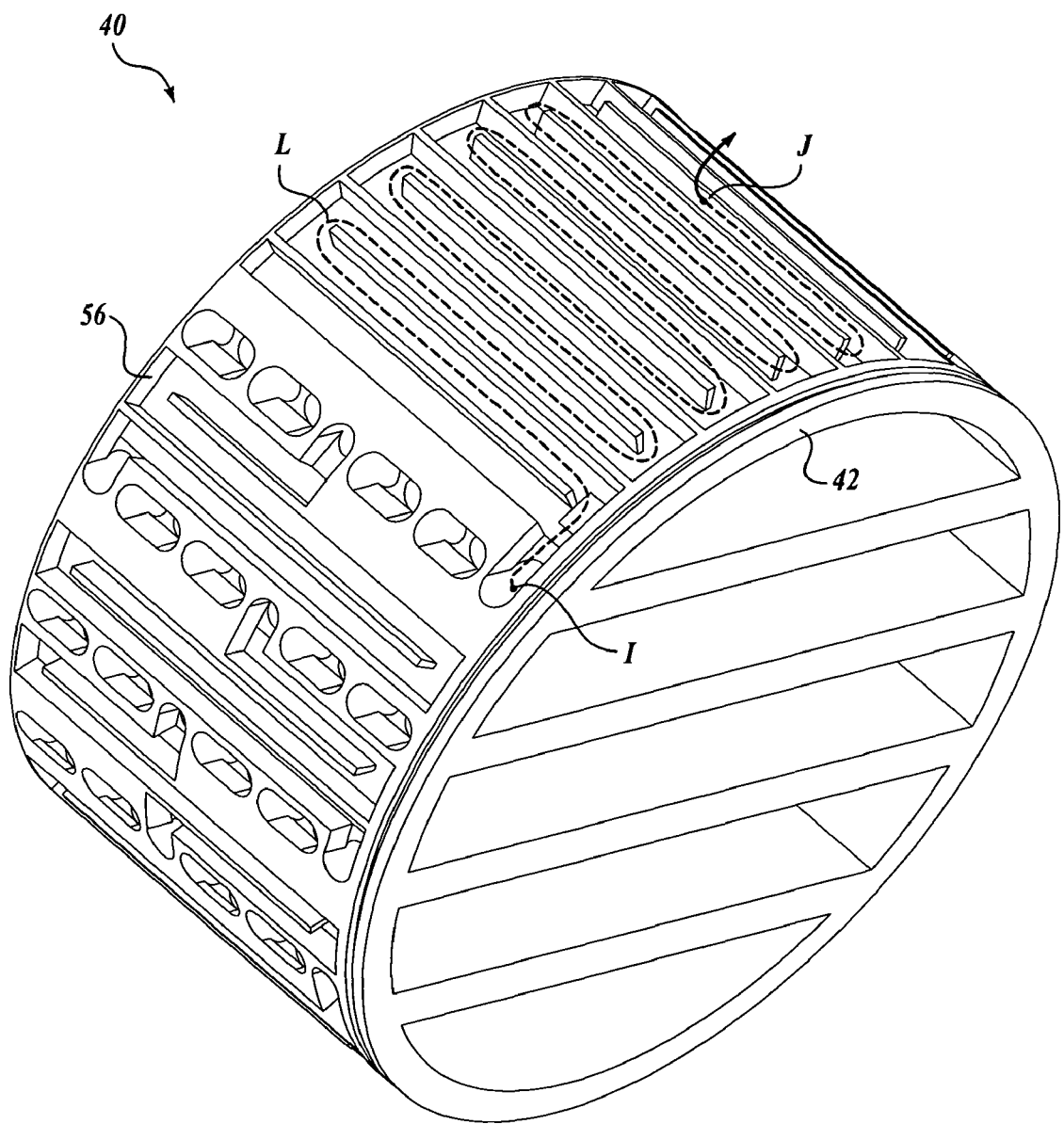
FIG. 9E is a corresponding perspective with the core shown in a different rotated position and illustrating a continuation of the flow path along the core.

FIGS. 9-9E show the configuration of the channels, bores, and paths for one half-section of the heat exchange 40. The other half-section would extend oppositely from the viewer and the center rib 56. The two half-sections are mirror images of each other. FIGS. 9-9E have a diagrammatic broken line L showing the connected segments of one of the four flow paths for the fluid to be heated by the heat exchanger.

Starting with FIG. 9, fluid to be heated enters at point A (an inlet 52 from FIG. 5) and follows the back-and-forth path to a port B (a port 64 from FIG. 5). In the partial section of FIG. 9A, port B can be seen at the top, as well as the serpentine path or passage through the first fin 46 and its outlet port C. From port C, the fluid is directed along the exterior of the liner 42 (part of the inner periphery is broken away in FIG. 9B to illustrate the flow path) to a port D in the next fin 46. From the central port D, the fluid is directed in the serpentine path to the exit port E, then along the exterior of the liner 42 to an inlet port F in the next fin 46. Moving to FIG. 9C, from port F fluid is directed through the third fin 46 to the outlet port G, then as seen in FIG. 9D, to an inlet port H in the last fin 46. The fluid follows the serpentine path along the parallel bores through the last fin to an outlet port I. Referring to FIG. 9E, which is rotated 90° from the orientation of FIGS. 9-9D, port I leads to the back-and-forth fluid path along the exterior of the liner 42 to port J which is the location of the fluid outlet through the outer jacket. For the half-section of the heat exchanger shown in FIGS. 9-9E, the second path follows the other passages of the fins, i.e., the identically formed passages toward the end portions of the fins farther from the viewer, and along the liner in the opposite direction from the inlet point A to the outlet point J. The preferred heat exchanger includes the identical upper half-section with two additional fluid paths, as described above, making four separate sinuous paths each of which has serpentine segments through each fin and segments along the exterior of the liner, between the liner and the jacket.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A heat exchanger comprising:
   an inner hollow liner forming a duct coupled to a rocket engine exhaust system for flow of exhaust gas therethrough, the inner hollow liner having an outer periphery and a plurality of transverse fins disposed in the duct and extending thereacross, each of the fins having a fluid passage therethrough with opposite ends in communication with the outer periphery of the inner hollow liner;
   an outer jacket joined to the inner hollow liner, the outer jacket having an inlet for entry of a fluid to be heated and an outlet for exit of the fluid to be heated; and
   a fluid path formed between the inner hollow liner and the outer jacket, the fluid path having a portion extending from the inlet of the outer jacket to an end of the fluid passage in one of the fins, a portion extending from the opposite end of said fluid passage in said one of the fins and from there to an end of the fluid passage in another of the fins, and a portion extending from the opposite end of said fluid passage of said another of the fins to the outlet of the outer jacket, whereby fluid introduced into the inlet of the outer jacket is conveyed between the outer jacket and the inner hollow liner, through each of the fins, and to the outlet of the outer jacket for heating of the fluid.

2. The heat exchanger defined in claim 1, in which the fluid passage in each of the fins in serpentine.

3. The heat exchanger defined in claim 1, in which the fluid path between the inner hollow liner and outer jacket is sinuous.

4. The heat exchanger defined in claim 1, including multiple separate fluid paths from the inlet of the outer jacket, between the outer jacket and the inner hollow liner, and through each of the fins.

5. The heat exchanger defined in claim 4, in which the inner hollow liner is formed in one piece.

6. The heat exchanger defined in claim 5, in which the passages of the fins of the one piece liner are serpentine.

* * * * *